Aug. 30, 1932.  G. W. GREENWOOD  1,874,503

EXTRUSION DIE

Filed July 12, 1930  2 Sheets-Sheet 1

Inventor

George W. Greenwood

By Mason Fenwick Lawrence
Attorneys

Aug. 30, 1932.    G. W. GREENWOOD    1,874,503
EXTRUSION DIE
Filed July 12, 1930    2 Sheets-Sheet 2
Fig. 3.
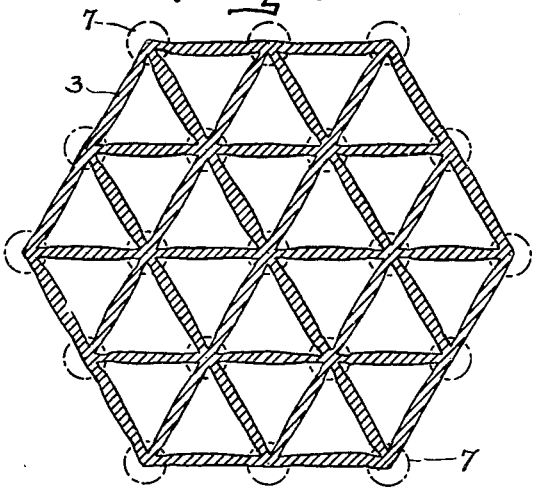
Fig. 4.
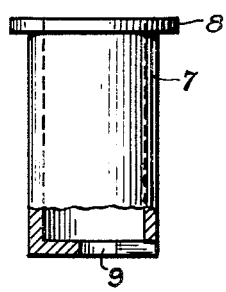
Fig. 6.
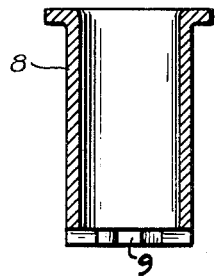
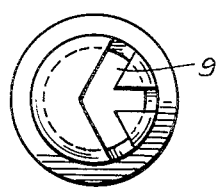
Fig. 5.
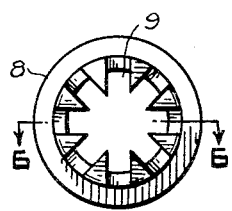
Fig. 7.
Inventor
George W. Greenwood
By Mason Fenwick & Lawrence
Attorney Patented Aug. 30, 1932

1,874,503

UNITED STATES PATENT OFFICE

GEORGE W. GREENWOOD, OF WILMINGTON, DELAWARE, ASSIGNOR TO STEPHEN F. WHITMAN & SON, INC., OF PHILADELPHIA, PENNSYLVANIA, A CORPORATION OF PENNSYLVANIA

EXTRUSION DIE

Application filed July 12, 1930. Serial No. 467,585.

This invention relates to candy manufacture and particularly to an extrusion die for making porous or cellular candy. The invention is not necessarily confined to the making of candy, however, but may be equally well adapted to the manufacture of porous or cellular extruded bodies from any plastic batch having the essential physical characteristics, similar to those of the candy batch.

In the making of porous or cellular candy, it is customary to extrude the batch vertically through a die from a suitable press, in a phalanx of filaments, each of which upon its being extruded being formed with lateral ribs, which come into contact with similar ribs upon adjacent filaments near the points of extrusion and while the candy is yet extremely plastic and adhesive, said ribs being knit together into partition walls, forming between two or more adjacent filaments, tubules which receive air in various ways adjacent the extruding means, the air filling the tubules and tending to keep the walls of the tubules apart so as to perpetuate the cellular condition of the extruded mass after it has hardened. It is customary in the manufacture of candy of this type to form the phalanx of filaments of considerably greater cross-section than the finished candy strip, to pull it down to smaller cross-sectional dimensions, thereby reducing the size of the tubules, then folding the strip upon itself to multiply the number of tubules and then pulling it again to effect further reduction in the diameter of the tubules and so on repeatedly until a very great number of very fine tubules have been produced.

In dies for making extruded candy of this type it has been customary to provide a one-piece die plate having a plurality of parallel apertures formed therethrough, said apertures being provided with radial slots extending through the die plate and by means of which the ribs are produced upon the extruding filaments. Such a die is extremely expensive to make and difficult to manufacture on account of the great amount of fine cutting which must be performed upon the die plate in order to produce the radial slots for so great a number of parallel perforations.

The present invention has for its object the provision of a composite die in which the plate may be initially formed with a suitable number of parallel perforations either by casting the plate with suitable cores or by drilling the plate. The perforations are furnished with snug linings in the form of hollow removable bushings which may be cheaply made by methods well known in the manufacture of tubing and formed at their inner ends with transverse slots providing for the extrusion of the rib portions of the filaments.

Other objects of the invention will appear as the following description of a preferred and practical embodiment thereof proceeds.

In the drawings in which the same characters of reference are used throughout the several figures to denote identical parts:

Figure 3 is a diagrammatic cross-section through a strip or ribbon of candy after having been extruded, the rib portions being shown united;

Figure 4 is an elevational view partly in section through one of the peripheral bushings;

Figure 5 is a bottom plan view of the bushing shown in Figure 4;

Figure 6 is a vertical section through one of the central bushings taken along the line 6—6 of Figure 7; and Figure 7 is a bottom plan view of the bushing shown in Figure 6.

Figure 1:
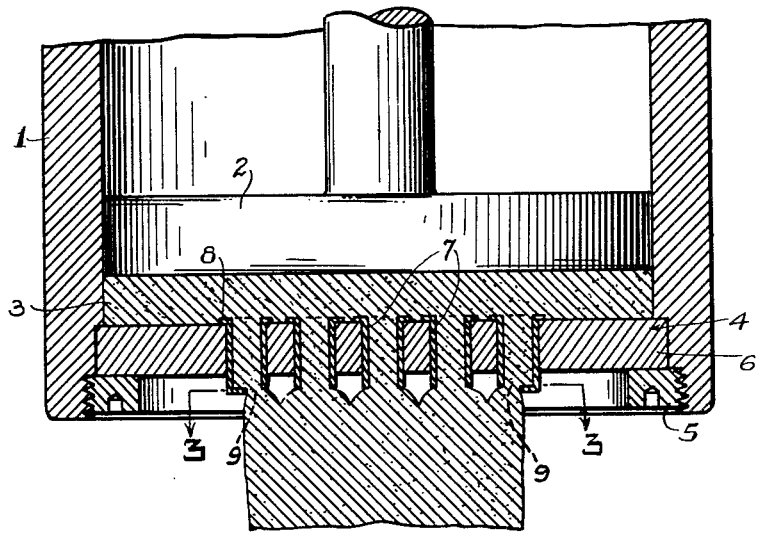
Figure 1 is a vertical section through an extrusion press, part being omitted showing the die constituting the present invention.
Figure 2:
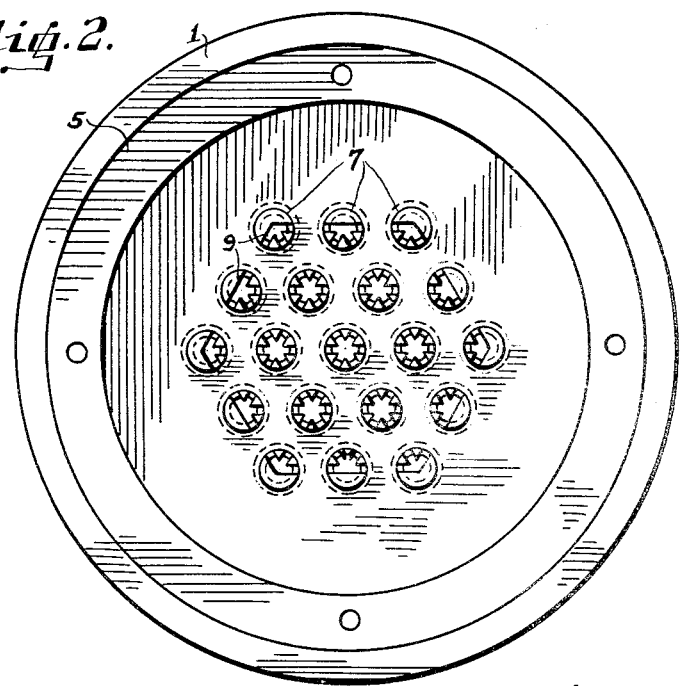
Figure 2 is a bottom plan view of the extruding press and die.

Referring now in detail to the several figures, the numeral 1 represents the extruding press which may be in the form of a cylinder and provided with a piston 2. It will be assumed that the piston 2 can be removed for the insertion of the plastic batch 3. It is not considered necessary here to show the detailed construction of the press and of the means by which the piston is withdrawn and the batch inserted, since such presses are well known in the art.

The die which in general is designated by the reference character 4 is secured within a shouldered recess at the bottom of the cylinder 1 and is held in place by suitable means such as the ring nut 5. The die consists of a plate 6 suitably apertured over its central area for the reception of the bushings 7. On account of the fact that the apertures are to receive bushings they can be initially made larger than if they were to be used directly for the extrusion of the candy filaments, and this facilitates the drilling of the perforations in the plate and makes it cheaper.

The bushings as will be noted from Figures 4 and 6, have flanges 8 at their upper ends so that when the bushings are positioned within the apertures they will be supported and retained by the said flanges which abut against the upper face of the plate 6. The bushings are preferably made with so snug a fit that they will be frictionally held from rotating while subjected to the extrusion pressure. The bushings preferably, project beyond the lower face of the plate 6, and as the extruded streams or filaments issue from said bushings, the projecting portions of said bushings afford an air space for supplying air to the tubules which form between the filaments.

The said bushings as shown were originally closed at their lower ends, the ends however, having then been formed with radial slots 9 produced by sawing or by a milling tool or similar device or which may be more cheaply made by merely punching them in the bottom wall of the bushings. The slots 9 are made to intersect and in effect form a central aperture for extruding the core of the filament, having radial slots through which the ribs of the filaments are extruded.

It is of course, unnecessary that the bottoms of the bushings shall be integrally closed for they may be plugged in any suitable manner if desired, with performed closures having the necessary apertures or slots to produce the desired ribbed characteristic, in the filaments.

Figure 7 shows the bottom end of a bushing in which the slots extends diametrically so that ribs will be formed on all sides of the extruded filament. These bushings are adapted particularly for the central part of the phalanx of filaments. Figure 5 shows a bottom plan view of a bushing in which one side of the bottom wall is left imperforate. This form of bushing is best adapted for the peripheral corners of the die pattern, since the formation of useless ribs on the outside of the extruded strip is avoided.

However, in practice it may be found cheaper to make all of the bushings of one pattern so that they are interchangeable, as the formation of ribs on the outside of the extruded mass is of no moment, since in the act of pulling the candy subsequent to its extrusion, such ribs will be pressed down into the surface of the mass and become entirely obliterated by the time the candy has reached its final form.

It is to be understood that the candy pattern as shown in Figure 3, is diagrammatic, and that the air in the tubules being under some slight pressure as the candy is pulled to smaller dimension, the air sustains the walls of the triangular tubules, preserving their tubular character.

While my invention in its preferred concept contemplates the use of removable and interchangeable bushings, it is obvious that the die can be made, by casting, for instance with a plurality of hollow bosses projecting from the lower surface thereof and having their ends formed with intersecting slots, the said bosses being the substantial equivalent of the bushings and functioning in the same way, both to form the ribs on the individual filaments and to supply air to the tubules formed by the coalescence of the ribs of adjacent tubules, in the manner previously explained.

It is to be understood that my invention is to be broadly considered and that the details of construction as shown and described are merely by way of example and not limitative in their bearing upon the scope of the appended claims.

Having thus described my invention, what I claim is:

1. Die for extruding plastic masses comprising a plate having a plurality of hollow bosses projecting from one face thereof, for the extrusion of said mass in filamentous form, the projecting ends of said bosses being formed with intersecting slots determining the formation of ribs on said filaments by means of which adjacent filaments unite to form tubules, the extent of the projection of said bosses beyond said plate surface determining an air space for supplying air to said tubules as they are formed.

2. Die for extruding plastic masses comprising a plate having a plurality of through perforations, bushings retained in said perforations and projecting from one face of said plate, said bushings functioning as passages for the extrusion of said mass in filamentous form, the projecting ends of said bushings being formed with intersecting slots determining the formation of ribs on said filaments by means of which adjacent filaments unite to form tubules, the extent of the projection of said bushings beyond said plate surface, determining an air space for supplying air to said tubules as they are formed.

3. Die for extruding plastic masses comprising a plate having a plurality of through perforations, bushings retained in said perforations and projecting from one face of said plate, said bushings functioning as passages for the extrusion of said mass in filamentous form, the projecting ends of said bushings being formed with intersecting slots determining the formation of ribs on said filaments by means of which adjacent filaments unite to form tubules, the opposite ends of said bushings being flanged to fiaciliate their retention, the extent of projection of said bushings beyond said plate surface determining an air space for supplying air to said tubules as they are formed.

In testimony whereof I affix my signature.

GEORGE W. GREENWOOD.